Sept. 1, 1936.  N. G. SCHATZ  2,052,802
WEED AND VINE CUTTER
Filed Aug. 5, 1935   2 Sheets-Sheet 1

Inventor
Norman G. Schatz

By

Attorney

Sept. 1, 1936.　　　　N. G. SCHATZ　　　　2,052,802
WEED AND VINE CUTTER
Filed Aug. 5, 1935　　　2 Sheets-Sheet 2

Inventor
Norman G. Schatz

By Cline Hutson

Attorney

Patented Sept. 1, 1936

2,052,802

UNITED STATES PATENT OFFICE 2,052,802

WEED AND VINE CUTTER

Norman G. Schatz, Sandy, Oreg., assignor of fifty per cent to "Jan" De Graff, Sandy, Oreg.

Application August 5, 1935, Serial No. 34,665

3 Claims. (Cl. 55—107)

This invention relates to weed and vine clearing machines. The primary object thereof is to provide a cutting apparatus that will cut weeds and vines and cast them to one side of a row or path traveled by a harvesting or digging implement.

While the present invention is not necessarily confined in its application, it finds particular use in clearing the ground preceding bulb and potato digging machines. In this particular it cuts all weeds and vines and casts them to one side of the rows thus leaving a clean row for the digging or exposing of the bulbs or potatoes as the case may be.

An object of the invention is to provide in a device of this character a rotating cutter blade so arranged that it may be easily raised or lowered during its operation so that it may be elevated above operating position or susceptible to various adjustments in operating position.

Another object of the invention is provide a supported operating means for the cutter head which will not obstruct the vision of the operator of the implement but will allow him to observe its operation in all its phases.

Another object of the invention is to provide in conjunction with the cutter blade, means for casting to one side and turning over the vines and weeds, together with top soil if desired, such means being extremely simple in its construction.

Another object of the invention resides in its being so constructed that it may be readily attached to various types of agricultural implements.

These and incidental objects of the invention will be seen and appreciated upon reading the specification following, aided by the several views in the drawings, wherein Figure 1 is a plan view of the invention mounted to the frame (a portion of which is shown only) of an agricultural implement of the digger type employed for digging crops growing at or below soil surface.

Figure 1:
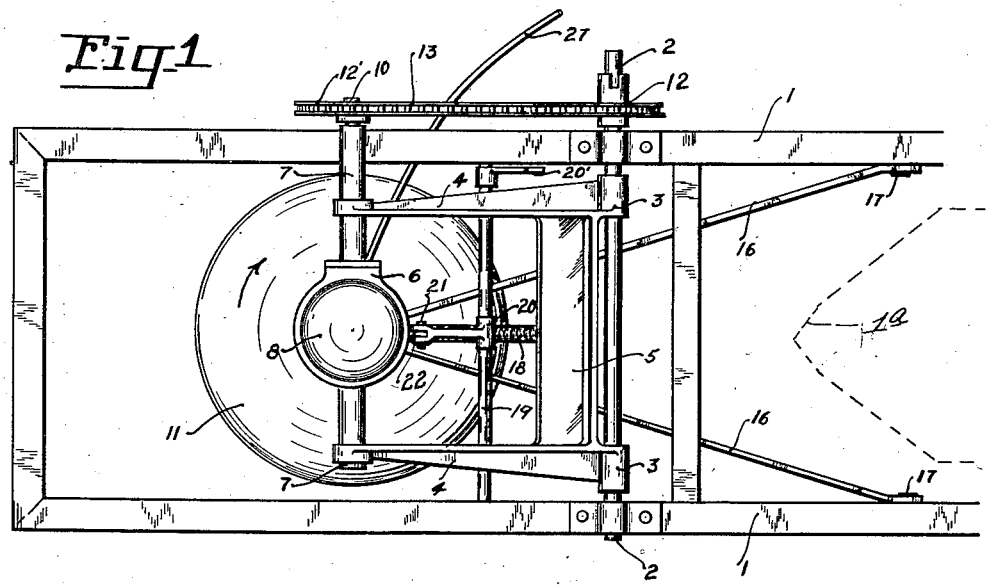
Figure 2:
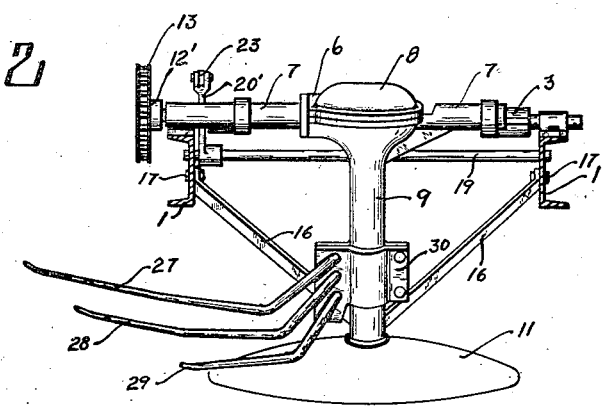
Figure 2 is a front elevation of the invention.
Figure 3:
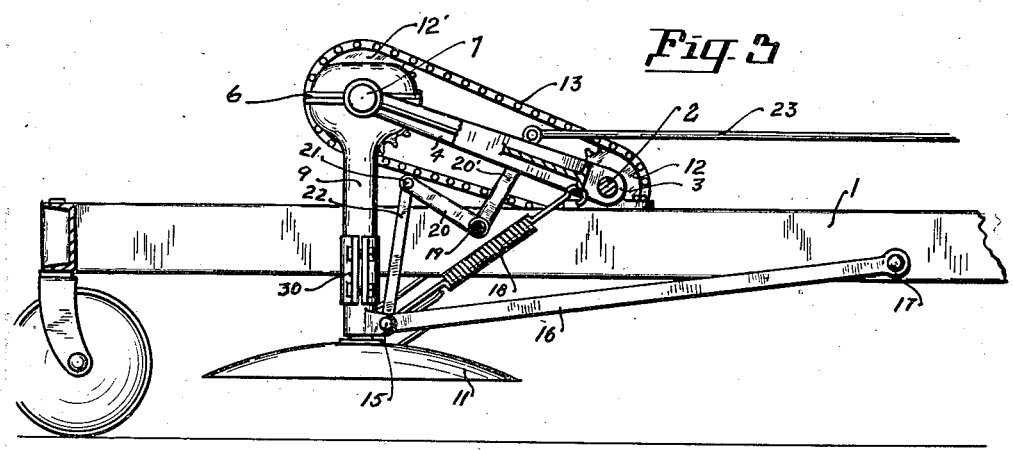
Figure 3 is a side elevation, parts in section. This view shows the cutting blade in upraised position.

In the drawings, 1 indicates a portion of the frame or side members of an agricultural digging implement, such for instance as a potato or bulb digger. Mounted transversely of the frame is a shaft 2 which constitutes the pivot and fulcruming support of the present invention. Mounted upon shaft 2 is a U-shaped frame 3 consisting of two spaced parallel arms 4 rearwardly pivoted to shaft 2 and a cross member 5, in the present instance integrally formed. A gear and shaft casing 6 having a horizontal shaft casing portion 7, a central gear casing portion 8 and a downward directed shaft casing 9 is carried by the forward ends of the arms 4 in suitable seats provided therein. A shaft 10 is mounted in the casing 7 which is connected by suitable bevel gears in casing 8 to a shaft in casing 10, the latter casing being more or less vertical and the concealed shaft being in a similar position. To the lower end of the shaft in casing 9, which projects from the lower end thereof, is mounted a cutting disk 11 which is a convexo-concave body with its convexity uppermost. Mounted upon the shaft 2, freely if said shaft is stationary, and solidly if said shaft is made to rotate, it being optional in either case, is a sprocket 12. A similar sprocket 12' is mounted on shaft 10, and over the two sprockets is trained a chain 13. Thus it will be seen that when sprocket 12 is rotated, by any suitable means, as from means derived from the implement to which the present invention is attached, rotation is transmitted through the means just described to disk 11.

Extending rearwardly from the base of casing 9 and having one end pivotally connected thereto by means of pin 15 is the steadying or bracing link 16 the other end of which is pivotally connected by means of pin 17 to the frame 1, there being two links in this instance, one each side of the implement. A spring type counter-weight is provided to overcome to a large extent the weight of the device and provided for easier raising and lowering thereof by means presently described which consists of the spring 18 having its opposite ends engaged and secured to the pin 15 and through an eye in the cross member 5.

Figure 4:
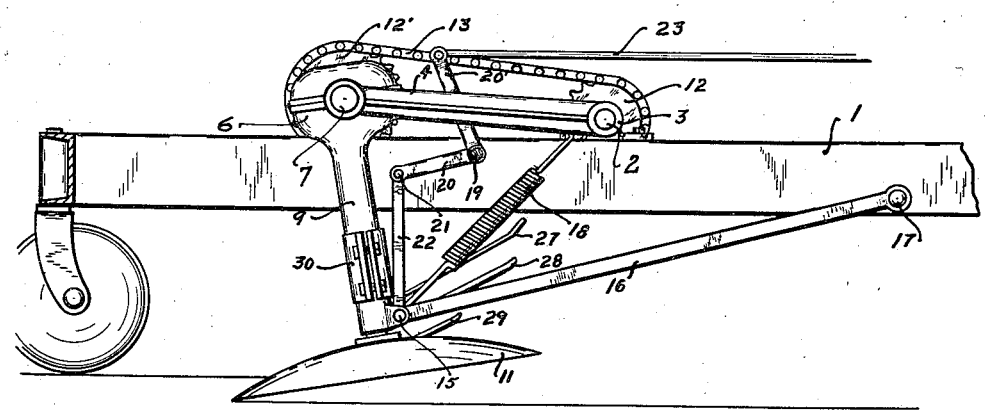
Figure 4 is similar to Figure 3 with blade in lowered or operating position.

From the foregoing, inasmuch as the member 3 is pivoted to the shaft 2, and the link is pivoted at pin 17, the rocking of member 3 in one direction or the other will raise or lower the casing 6 and consequently the disk 11. However, by reason of the difference of lengths in the members 16 and members 4, as the casing 6 is lowered the casing 9 will be tipped forwardly as shown in Figure 4 with the disk 11 at an incline to the horizontal. Means for raising and lowering the disk as described and positioning it in intermediate positions is provided. This consists of shaft 19 carried by frame 1. To this shaft is mounted lever 20, the free end of which is pivotally connected by means of pin 21 to one end of the link 22 whose other end is connected to pin 18. Another lever 20' attached to shaft 19 has its free end attached to operating rod 23 which may connect with a suitable operating lever (not shown) mounted to frame 1. However it will be readily seen that operation of the operating rod 23 will operate the lever 20 and lever 20' which in turn will raise or lower frame 6 and disk 11 through the medium of the link 22. As the present invention is carried along by the implement to which it is attached it precedes such implement, or rather the soil engaging elements there of such as the scoop 1a of implement 1. In operation as shown in Figure 4, the disk 11 is lowered so that its forward edge is slightly below the soil surface, the disk at an inclination to the horizontal. In this position the disk cuts the vines and weeds which it raises by reason of its convexity and the inclination to which it is positioned. However, if means are not provided for disposing of the material so raised it will drop back into its former position. In the present instance means are provided for casting such material to one side of the row or line of movement of the implement. This consists in deflectors, consisting of one or more rods, three in number in this instance, indicated by the numerals 27, 28, and 29. These have their one ends secured to the clamp 30 which clamp in turn is secured about the casing 9. As will be noted the members 27, 28, and 29 are bent rearwardly and to one side of the device and with respect to frame 1. Also it will be noted that the rods are unequal in length with the lowermost rod 29 being the shortest, the intermediate rod 28, (the rods being one above the other) next, and the uppermost rod 27, the longest. The disk 11 rotates in the direction indicated by the arrow thereon in figure 1. This has a tendency to carry the material cut and raised thereby toward the deflectors which push it to one side, and by reason of the fact that as the material is unsupported by the lower rod 29, by reason of its being somewhat shorter than the others, such material is pushed or turned over along side of the row or line of travel of the implement. As the device proceeds it clears the soil for the operation of the implement to which it is attached. In the digging of bulbs or potatoes these products are deposited in a row which has been cleaned of vines and other growth.

In the employment of the present invention, it is to be understood that it is not limited to association with the specific implements herein enumerated, as it is obviously adapted to association with other implements, or it may be employed separate from implements.

Particular attention is called to the mounting of disk 11 by means of the frame 3. This allows at all times, by reason of its openwork construction, complete visibility of the cutting implement 11 by the driver or operator, and permits him to readily adjust the blade 11 as the implement is progressed over the soil to accommodate it to the inequalities of the soil surface, or to the particular needs for the work in which it is employed.

While a specific form of the improvement has been described and illustrated herein, it is desired to be understood that the same may be varied, within the scope of the appended claims, without departing from the spirit of the invention.

Having described my invention, I claim—

1. In an agricultural implement, a driven cutting disk, a casing supporting such disk and its driving means, a frame pivotally mounted and provided with arms at the ends of which the casing is rockably mounted, means for pivoting the frame to raise or lower the disk, a connecting link holding the disk at an inclination when it is lowered proximate the soil surface, and a plurality of rods the lowermost shorter than the others extending in a lateral-rearward direction which deflect and turn over the material cut by the disk to one side thereof.

2. In an agricultural implement, a main frame, a driven cutter disk, a casing supporting the cutter disk and the driving means therefor, a pair of rocking arms pivotally attached to the main frame supporting the casing by having their free ends pivotally attached to the upper end of such casing, and rods substantially longer than the arms each having one end pivotally connected to the main frame and the other end pivotally connected to the lower end of the casing.

3. In an agricultural implement, a main frame, a driven cutter disk, a casing supporting the cutter disk and the driving means therefor, arms having their rear ends pivotally connected to the main frame and their forward ends pivotally connected to the upper end of the casing, and rods each having one end pivotally connected to the frame rearwardly of the arms and the other end pivotally connected to the lower end of the casing, said rods being substantially longer than said arms.

NORMAN G. SCHATZ.